United States Patent [19]
Sheehan

[11] Patent Number: 5,585,150
[45] Date of Patent: Dec. 17, 1996

[54] MULCH PRODUCT AND PROCESS FOR ITS PREPARATION

[75] Inventor: Richard W. Sheehan, Johnson City, Tenn.

[73] Assignee: Mulch Developement Company, Johnson City, Tenn.

[21] Appl. No.: 302,185

[22] Filed: Sep. 8, 1994

[51] Int. Cl.⁶ .................................................. A01G 13/02
[52] U.S. Cl. .................................... 428/15; 47/9; 428/17
[58] Field of Search ..................... 47/9, 59 CO; 428/15, 428/17

[56] References Cited

U.S. PATENT DOCUMENTS

| | | | |
|---|---|---|---|
| 3,269,824 | 8/1966 | Aswell | 47/9 X |
| 3,812,615 | 5/1974 | Jamison | 428/15 X |
| 4,067,140 | 1/1978 | Thomas | 47/9 |
| 4,123,483 | 10/1978 | Nakahara et al. | 65/429 |
| 4,232,480 | 11/1980 | Videen | 47/9 |
| 4,339,890 | 7/1982 | Koenig et al. | 47/9 |
| 4,369,054 | 1/1983 | Shinholster, Jr. et al. | 47/9 X |
| 4,788,790 | 12/1988 | Zeager | 47/9 |
| 5,105,577 | 4/1992 | Hedges | 47/9 |
| 5,330,804 | 7/1994 | Allison et al. | 428/17 X |

FOREIGN PATENT DOCUMENTS

| | | | |
|---|---|---|---|
| 4-34098 | 2/1992 | Japan | 47/59 CO |

*Primary Examiner*—Henry F. Epstein
*Attorney, Agent, or Firm*—Larson and Taylor

[57] ABSTRACT

A biodegradable mulch product comprising sheets or finely divided particles of cellulosic fibrous material bonded together with a bonding agent comprising a water-based bonding adhesive and compressed to form a laminar layer, said compressed laminar layer being cut into mulch-size pieces that simulate natural tree mulches in appearance, density and rate of biodegradation.

17 Claims, 1 Drawing Sheet

MULCH PRODUCT AND PROCESS FOR ITS PREPARATION

BACKGROUND OF THE INVENTION

This invention relates to a biodegradable mulch product and to a process for its preparation. In a particular embodiment, the present invention is directed to biodegradable products of waste paper materials.

The preparation of mulch products by the shredding of paper is well known in the prior art. For example, Koeing et al, U.S. Pat. No. 4,339,890, teaches shredding waste paper into finely divided particles and mixing the shredded paper with dry chemicals in powdered form. The process is a dry formula for hydroseeding.

Videen, U.S. Pat. No. 4,232,480, discloses hydraulic mulch for hydroseeding comprising fibrous material of finely shredded paper. The function of the fibrous material is to hold the mixture together during hydroseeding.

Thorman, U.S. Pat. No. 4,067,140, discloses finely ground paper which is processed with a wetting agent and colored, then dried. This material is used in a formula for hydroseeding. Specifically, one acre requires 3200 gallons of water, 1400 pounds of paper mulch, 800 pounds of fertilizer and 200 pounds of seed.

The Koeing et al, Videen and Thorman patents disclose methods for the production of hydroseeding formulas used to promote germination of seeds in highly eroded areas, highway embankments, etc. Also, in each instance, the paper mulch prepared tends to become a coagulated or cohesive mass or a blanket of fiber. Also, the mulch prepared by the aforementioned patents decays in 3 to 4 weeks which coincides with the germination and growing of natural grass.

In view of the short-life that characterizes the mulch products of the prior art patents discussed above, the products are unsuitable as substitutes for natural wood mulch commonly used to mulch, for instance, trees, bushes and the like.

Kelley, U.S. Pat. No. 4,123,483, teaches a means of shredding, baling, and pelletizing paper and paper products for use as mulch and animal fodder. In the case of animal fodder, waste paper is used for its cellulose fiber content and as a substitute for other types of cellulose containing green roughage.

The mulch product of Kelley likewise does not have the durability and low rate of biodegradation necessary to render it a suitable substitute for natural wood mulch.

It is an object of the present invention to provide a mulch product of a cellulosic material that resembles natural wood mulches in durability.

It is also an object of the invention to provide a mulch product that biodegrades in the presence of aerobic organisms, a completely natural decomposition process as opposed to waste paper materials which commonly end up in landfills. Since, in a landfill situation, aerobic organisms do not live subterraneously, it is very difficult for the waste paper product to biodegrade.

Another object of the invention is to provide a product which is non-toxic and otherwise environmentally acceptable.

Yet another object of the invention is to provide a tree mulch of cellulosic fibrous material such as waste paper that simulates natural tree mulch in appearance, in durability and in the rate of biodegradation.

A further object of the invention is to provide a simulated tree mulch that requires far less amounts to be used in mulching a given area than natural tree mulch.

SUMMARY OF THE INVENTION

These and other objects of the invention are obtained by a biodegradable mulch product comprising sheets or finely divided particles of cellulosic fibrous material bonded together with a bonding agent comprising a water-based bonding adhesive and compressed to form a compressed laminar layer, said laminar layer being cut into mulch-sized pieces that simulate natural tree mulches in appearance, durability and rate of biodegradation.

Figure 3:
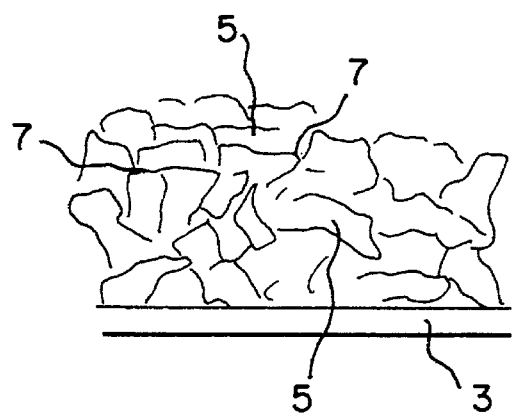
FIG. 3 is a perspective of the mulch pieces of the invention formed by bonding together a sheet of paper and a layer of particles with a water-soluble bonding adhesive compressing to form a laminar layer and cutting into said mulch-size-pieces.

With reference to the drawing, one embodiment of the invention, the biodegradable mulch product 1 comprises a first layer comprising at least one sheet of a cellulosic fibrous material 3 and a second layer comprising finely divided particles 5 of cellulosic material, bonded together with a bonding agent 7 comprising a water-based bonding adhesive, said first and second layers being compressed to form a laminar layer, said laminar layer being cut into mulch-sized pieces 1 that simulate natural tree mulches in appearance, durability and rate of biodegradation (see FIG. 3). If desired, the biodegradable product of the invention can comprise alternating layers of said first and second layers, compressed into a laminar layer and cut into mulch-size pieces.

Figure 2:
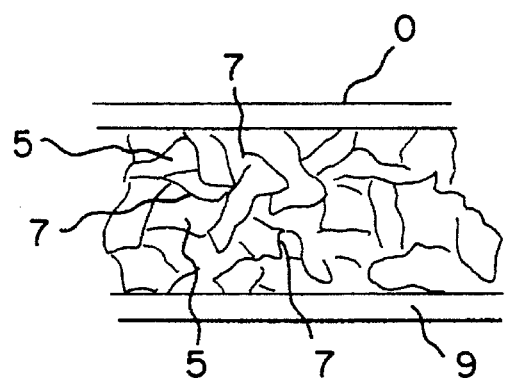
FIG. 2 is a perspective view of mulch pieces of the invention formed by bonding together particles of cellulosic fibrous material between two sheets of paper, compressing to form a laminar layer and cutting into said mulch-size pieces.

In a preferred embodiment, the laminar layer of bonded finely divided particles of cellulosic fibrous material is sandwiched and bonded between two sheets 9, 9' of paper prior to cutting into mulch-size pieces (see FIG. 2).

Figure 1:
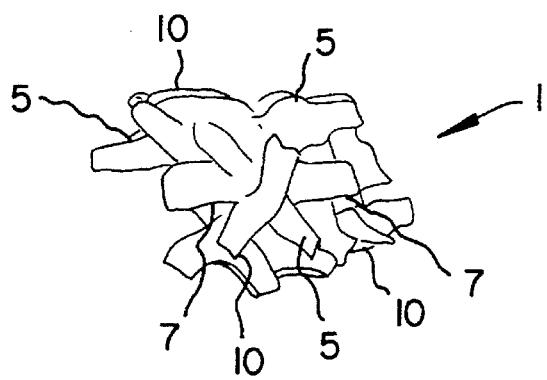
FIG. 1 is a perspective view of mulch pieces of the invention comprised of finely-divided particles of cellulosic fibrous material bonded together with water-based bonding adhesive, compressed, but into said mulch pieces and coated with a biodegration agent.

In another embodiment of the invention as shown in FIG. 1, the biodegradable product of the invention can be prepared by a method comprising bonding together sheets or finely-divided cellulosic material 5 with a bonding agent comprising a water-based bonding adhesive to form a laminar layer, compressing the laminar layer, and cutting the compressed layer into pieces that substantially simulate natural tree mulches in appearance, durability and rate of biodegradation and coating the pieces with a biodegradation agent 10. Alternatively, alternate layers of sheets and finely divided particles can be bonded together and the bonded multiple layers compressed to form the laminar layer that is subsequently cut into the mulch size pieces.

DETAILED DESCRIPTION OF THE INVENTION

The cellulosic fibrous material of the invention is preferably paper, more particularly waste paper. The term "waste paper" as used herein and the appended claims means used paper such as newspaper, bond paper, writing paper, wrapping paper, corrugated board, cardboard, paperboard, paper tubes and cones and similar used paper materials. When finely divided particles of cellulosic fibrous material are employed to produce the mulch product of the invention, they can be made by shredding, grinding or otherwise reducing the material using any suitable reducing means such as shredders and/or grinders that are well known in the art. Illustrative of suitable comminuting means are paper shredders, hammermills, tub grinders, grinding wheels and the like.

It has also been found that the finer the material used, the more even and consistent the end product will be. In the case of fibrous material and/or extremely fine chopped paper, it is preferred to pre-wet (hydrate) the mixture with water before the addition of any adhesives, stiffing agents, binders, pigments or dyes. In fact, it has been found that by so pre-wetting the fiber or filler material that a laminar layer can be formed with or without any paper layers in a sandwich blend. Once the wetted material is compressed and dried, it can itself be coated with rigidifying or stiffing agents to improve integrity. Further, pigments or dyes, if employed, can be added to the bonding adhesive base or applied as a coating thereto.

The water-based bonding adhesives admixed with the finely divided particles and/or sheets of the invention can be any water-based bonding adhesive which is non-toxic to vegetation and which possesses a polymeric or molecular size sufficient to guard against premature biodegradation or decomposition of the final product. Examples of suitable adhesives are neoprene emulsions, vinyl chloride and vinylidene chloride resins, vinyl acetate resins, latex resins, etc. Optionally, rigidifying or stiffing agents in effective amounts such as acrylic resins, rosin, styrene-butadiene polymers, styrene/acrylic acid resins, etc. can be included, if desired. The preferred adhesive binder matrix is a mixture of neoprene emulsion or vinyl acetate homopolymer mixed with acrylic resins for stiffness and water repellency.

In order to achieve the desired durability and rate of biodegradation, that is, a durability and rate of biodegradation that is substantially like that of natural wood, it may be necessary to coat the exterior of the cut pieces with any of the well known biodegradation retarding agents, such as paraffin wax or mineral wax, or water-repellant sizing agents such as acrylic resin binder, acrylic homopolymers and acrylic copolymer. Also, if desired, insecticides such as pine tar resins or herbicides such as potassium chloride can be incorporated in the laminar layer or coated onto the cut pieces.

To achieve the appearance of natural tree mulch, it is preferred to incorporate a colorant such as a dye and/or pigment in the laminar layer of sheets and/or finely divided particles and bonding adhesive. The dyes and/or pigments are selected so as to, either alone or in combination, produce a color substantially equivalent to the natural colors of the tree mulch of choice. Again, the dyes or pigments must be non-toxic to vegetation. Suitable dyes include direct dyes, substantive dyes, reactive dyes and foodstuff dyes. Also, foodstuff dyes, wherein the dye components are encapsulated in aluminum hydroxide, are available as pigments. Such pigments are commonly referred to as Aluminum Lakes. Other suitable pigments include carbon black, Pigment Blue No. 15, commercially available as Fenalan Blue FD 312 and Pigment Orange No. 5, commercially available as "Luconyl Orange 3052."

In the embodiment of the invention wherein a layer of finely divided particles and binder adhesive is sandwiched between sheets of paper, it is preferred for best results to add the colorant to both the sheets and the layer. Once a layer or multiple layers of finely divided particles and/or sheets, binder and additives, if any, is formed, the layer or layers is compressed to a thickness and density that provides the desired durability and rate of decomposition using any conventional compressing means, such as a pressure plate. The thickness and density will vary depending upon the type of mulch product being prepared, but in all instances the thickness and density will be such that a final product having a durability and rate of biodegradation is provided. In most instances, the thickness of the final mulch product will fall in the range of 0.100 inch to 0.250 inch and the density between 3 lbs/FT$^3$ and 6 lbs/FT$^3$.

The preferred compression rate for compressing the laminar layer generally falls within the range of about 5 to 200 psi depending upon the density desired in the final product.

After the compression step, the compressed product is dried, preferably at a temperature of 80° to 120° C., and cut by any suitable cutting means into pieces of the desired mulch shape.

This invention will be further described by reference to the following examples.

EXAMPLE I

Using a paper shredder, sheets of newspaper are shredded into confetti-like shape and 500 cc of the thus-shredded paper is then soaked in a bath of 50 cc of neoprene emulsion and 50 cc acrylic resin containing 10 cc Red No. 40 Aluminum Lake pigment. The resulting slurry is metered into a tray until a layer approximately 0.175 inch is built-up. The layer thus-formed is compressed using a pressure plate and a compression of 25 psi. The compressed layer is then dried at a temperature of 100° C. for 10 minutes and cut into pieces approximately 2 inches long, ½ inch wide and ⅛ inch thick, having a density of approximately 3 lbs/ft$^3$. The pieces are then sprayed with acrylic resin, dried and packaged.

EXAMPLE II

Heavy walled paper tubing and cones up to ¼ inch thick, used for textile take-up packages, is shredded and ground using a grinder wheel to provide pieces approximately equivalent to the base cellular fiber. The 500 cc is soaked in a 50 cc bath containing 45 cc vinyl acetate and 5 cc of Benzoflex 50 (1:1 dipropylene glycol dibenzoate and diethylene glycol dibenzoate). The resulting slurry is metered onto a sheet to form a layer ⅜ inches thick and compressed as in Example I to a thickness of ⅛ to 3/16 inches, and dried and coated with pigment and binder and cut to resemble shredded tree mulch.

EXAMPLE III

Sheets of newspaper are shredded into confetti size using a paper shredder to provide 1000 cc of shredded paper. The shredded paper is soaked in 100 cc of 50/50 neoprene emulsion/acrylic acid binder and the resulting slurry metered between two sheets of paper so as to form a sandwich ½ inch thick. The resulting sandwich is compressed as in Example I, coated with Red No. 40 Aluminum Lake pigment and cut into 1"×½" long and ⅛"×3⁄16" thick. The density of the final product is 4 lbs/ft$^3$.

EXAMPLE IV

Sheets of newspaper are laid-up one over the other. Each sheet is coated with a 50/50 mixture of neoprene emulsion and acrylic resin to form a sandwich of approximately 0.125 inch in thickness. The sandwich is compressed using 20 lbs/in$^2$ and cut into pieces ½ inch wide and 2 inches long.

EXAMPLE V

Sheets of newspaper are shredded into large pieces of approximately ½ inch square to 1 inch square. The shredded paper is soaked in a bath of a mixture of 50/50 neoprene emulsion/acrylic resin and the resultant slurry is metered between two sheets of paper to form a sandwich. Due to the large size of the paper pieces, the pressed layer is not uniform. The thickness will vary from 1⁄16 inch to 3⁄16 inch, producing a natural texture to the material. The sandwich is compressed using 20 lb/in$^2$ and cut into the size of pine bark chips.

EXAMPLE VI

Finely ground textile tubes (fibrous matter) is mixed with finely shredded waste paper. 500 cc of the admixture is then combined with vinyl acetate adhesive and sandwiched between 2 sheets of paper to form a laminar layer 0.175" thick. The laminar layer is then compressed at 20 lbs/in$^2$, dried coated with No. 4 Aluminum Lake pigment and cut into pieces 2 inches long, ½ inch wide and ⅛ inch thick.

In general, the invention has the ability to produce a biodegradable mulch product, comparable to most shredded tree mulches. In addition, any desired shape is possible which includes bark chips, bark nuggets, pine needles, etc. Furthermore, the material can be dyed or coated with pigment to obtain any color desired for a decorative effect. Typically, natural tree mulches will range in density from 9–18 lbs/ft depending on moisture content and wood type. The present invention can produce mulches of much lower, e.g. as low as 3 lbs/FT$^3$ which means that far less amounts can be used in mulching a given area than is possible with natural tree mulch.

It is claimed:

1. A biodegradable mulch product comprising mulch-sized pieces formed from sheets or finely divided particles of cellulosic fibrous material bonded together with a bonding agent comprising a water-based bonding adhesive and compressed to form a laminar layer and simulating natural tree mulches in appearance, density, durability and rate of biodegradation.

2. A biodegradable mulch product according to claim 1 wherein the density is about 3 lbs/ft$^3$ to 6 lbs/ft$^.$.

3. A biodegradable mulch product according to claim 1 further containing a biodegradation retarding agent.

4. A biodegradable mulch product according to claim 3 wherein the retarding agent is paraffin wax or an acrylic polymer.

5. A biodegradable mulch product according to claim 3 wherein the biodegradation retarding agent is present as a coating on said pieces.

6. A biodegradable mulch product according to claim 1 further containing a coloring agent.

7. A biodegradable mulch product according to claim 6 wherein the coloring agent is selected from the group consisting of dyes, pigments and mixtures thereof.

8. A biodegradable mulch product according to claim 1 wherein the cellulosic fibrous material is paper.

9. A biodegradable mulch product according to claim 8 wherein the paper is waste paper.

10. A biodegradable mulch product according to claim 1 wherein said laminar layer prior to cutting into mulch size pieces is sandwiched between two sheets of paper.

11. A biodegradable mulch product comprising finely divided particles of cellulosic fibrous material bonded together with a bonding agent comprising a water-based bonding adhesive and compressed to form a laminar layer, said compressed laminar layer being cut into mulch-size pieces that simulate natural tree mulches in appearance, density and rate of biodegradation.

12. A biodegradable mulch product according to claim 11 wherein said laminar layer prior to cutting into mulch size pieces is sandwiched between two sheets of paper.

13. A biodegradable mulch product according to claim 12 wherein the sheet of paper is a sheet of waste paper.

14. A biodegradable mulch product according to claim 13 coated with a coloring agent.

15. A biodegradable mulch product according to claim 14 wherein the coloring agent is selected from the group consisting of dyes, pigments and mixtures thereof.

16. A biodegradable mulch product comprising mulch-sized pieces formed from a first layer comprised of a sheet or sheets of cellulosic fibrous materials and a second layer of finely divided cellulosic fibrous material, bonded together with a bonding agent comprising a water-based bonding adhesive, said layers being compressed to form a laminar layer, and simulating natural tree mulches in appearance, density, durability and rate of biodegradation.

17. A biodegradable mulch product according to claim 16 wherein said laminar layer prior to cutting into mulch size pieces is sandwiched between two sheets of paper.

* * * * *